3,629,446
METHOD OF COMBATTING FUNGIC OF GENUS USTILAGO

Paul-Ernst Frohberger, Leverkusen, Engelbert Kuhle, Bergisch-Gladbach, Germany, and Otto Ewald Urbschat, deceased, late of Cologne-Mulheim, by Gertrud Emma Marig Gerda Urbschat, heiress, Cologne-Mulheim, Germany, assignors to Farbenfabriken Bayer Aktiengesellschaft, Leverkusen, Germany
No Drawing. Filed Jan. 13, 1969, Ser. No. 790,889
Claims priority, application Germany, Jan. 15, 1968,
P 16 67 975
Int. Cl. A01n 9/00
U.S. Cl. 424—289   4 Claims

ABSTRACT OF THE DISCLOSURE

Fungicidal compositions (especially seed dressings) of and methods of combating fungi using certain benzohydroxamic acid salts, i.e. benzohydroxamic acid alkali metal, alkaline earth metal, heavy metal, ammonium and alkylammonium salts, some of which are known, which possess fungicidal properties and which may be produced by conventional methods.

---

The present invention relates to and has for its objects the provision for fungicidal compositions (especially seed dressings) of certain benzohydroxamic acid salts, i.e. benzohydroxamic acid alkali metal, alkaline earth metal, heavy metal, ammonium and alkylammonium salts, some of which are known, and which possess fungicidal properties, in the form of mixtures of such compounds with solid dispersible carrier vehicles or with liquid dispersible carrier vehicles containing a surface-active agent, and methods for using such compounds in a new way, e.g. alone or in the form of such compositions, for combatting fungi, especially phytopathogenic fungi of the genus Ustilago with other and further objects becoming apparent from a study of the within specification and accompanying examples.

It is known that benzohydroxamic acid (A) can be used in seed dressings, in particular for the control of loose smut (Ustilago) (compare German Auslegeschrift 1,210,620 and copending U.S. application Ser. No. 749,915, filed July 26, 1968 which is a streamline continuation of U.S. application Ser. No. 438,369, filed Mar. 9, 1965).

Benzohydroxamic acid (A) has, however, the disadvantage that it can exert an irritant effect on the skin and mucous membranes of man and animals over long term exposure.

When active compounds are used as seed dressings, such a disadvantage is serious. Seed dressings must be distributed uniformly in small amounts on the comparatively large surface of the seed. For this purpose it is a prerequisite that such dressings be mixed with the seed as a very fine-grained powder or fine spray. Hence the personnel who operate dressing machines during the dressing season which, in general extends for several months twice in each year, are unavoidably exposed for a lengthy period to these solid or liquid form finely-divided active compounds. For this reason, the highest requirements are demanded of the skin compatibility and mucous membrane compatibility of such active compounds. This also applies particularly when the seed is sown by hand or the operator at the sowing machine is exposed to the dressing dust which is generated during sowing of the dressed seed.

It has been found in accordance with the present invention that certain benzohydroxamic acid salts, some of which are known, of the formula

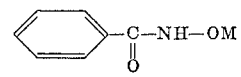

(Ia)

in which

M is an equivalent of an alkali metal, an alkaline earth metal, a heavy metal, an ammonium ion or an alkylammonium ion, exhibit strong fungicidal properties.

It is decidedly surprising that the salts of benzohydroxamic acid usable according to the present invention, in comparison with benzohydroxamic acid (A), exhibit at least equal fungitoxic effectiveness, with little or no irritant effect on human and animal skin or mucous membrane. The particular active compounds according to the present invention, i.e. the fungicidal compositions and methods of combatting fungi using such active compounds according to the present invention, therefore represent a valuable enrichment of the art.

The instant compounds are clearly characterized by the above-mentioned Formula Ia.

Advantageously, in accordance with the present invention, in the various formulae herein:

M represents an equivalent of:

Alkali metal such as Na, K, Li, Rb, Cs, and the like, especially Na and K, and more especially Na;

Alkaline earth metal such as Ca, Mg, Ba, Sr, Ra, and the like, especially Ca and Mg, and more especially Ca;

Heavy metal such as Ti, V, Cr, Mn, Fe, Co, Ni, Cu, Zn, Ga, Ge, Zr, Cb (Nb), Mo, Ru, Rh, Pd, Ag, Cd, In, Sn, Hf, Ta, W, Re, Os, Ir, Pt, Au, Hg, Tl, Pb, and the like, especially Zn, Cu, Fe, Mn, Sn, and Ni, and more especially Zn and Mn; including all valencies of such heavy metals, especially bivalent heavy metals;

Ammonium, i.e. $NH_4$; and

Alkylammonium such as mono, di and tri alkyl hydrocarbon of 1–12 carbon atoms, including straight and branched chains, such as methyl, ethyl, n- and iso- propyl, n-, iso, sec.- and tert.-butyl, amyl, isoamyl, hexyl, isohexyl, heptyl, octyl, nonyl, decyl, undecyl, dodecyl, and the like, -ammonium, especially mono, di and tri lower alkyl ammonium, more especially mono, di and tri $C_{1-4}$ alkylammonium, and most especially tri ($C_{1-4}$ alkyl) ammonium.

Preferably, M is Na, K, Ca, Zn, Mn and tri ($C_{1-12}$ or $C_{1-4}$ alkyl) ammonium.

Some of the instant salts of benzohydroxamic acids are known. The instant new salts can be prepared simply, according to the usual methods for the preparation of salts of organic acids.

The preparation of the water-soluble alkali metal salts, alkaline earth metal salts and ammonium salts takes place expediently by reaction of benzohydroxamic acid with the equivalent amount of an alkali metal hydroxide or alkaline earth metal hydroxide or of an amine in aqueous or alcoholic solution and subsequent complete or partial evaporation of the solvent.

The preparation of the water-insoluble heavy metal salts takes place expediently by mixture of an aqueous solution of a water-soluble salt of benzohydroxamic acid, for example sodium benzohydroxamate, with an aqueous solution of a water-soluble heavy metal salt. The desired sparingly soluble heavy metal salt of benzohydroxamic acid is thereby precipitated.

Advantageously, because of their strong fungicidal activity and their extremely low toxicity and concomitantly low phytotoxicity to higher plants, the particular active compounds according to the present invention are suitable as seed dressings for the control of seed-born phytopathogenic fungi. Particularly good results are achieved in the control of phytopathogenic fungi of the genus Ustilago.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohol (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, nematocides, bactericides, bird repellents, micro-nutrients, germination stimulants, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.1–50%, preferably 3–30%, by weight of the mixture. Thus, the present invention contemplates over-all compositions which comprise mixtures of a conventional dispersible carrier vehicle such as (1) a dispersible inert finely divided carrier solid, and/or (2), a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.1–95%, and preferably 3–95%, by weight of the mixture.

The active compound can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying technques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound, or even the 100% active substance alone, e.g. about 20–100% by weight of the active compound.

In particular, the present invention contemplates methods of selectively killing, combatting or controlling fungi, which comprises applying to at least one of (a) such fungi and (b) their habitat, i.e. the locus to be protected, e.g. seeds, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, or as seed dressings, and the like.

It will be realized, of course, that the concentration of the particular active compound utilized in admixture with the carrier vehicle will depend upon the intended application. Therefore, in special cases, it is possible to go above or below the aforementioned concentration ranges.

As to seed dressings specifically, application takes place according to the usual methods for dressing seed. These include dry dressing, wet dressing, moist dressing and slurry dressing. The dressings, i.e. said compositions containing the active compound in admixture with the carrier vehicle, are, as a rule, applied in a concentration of from 1 to 50 g. per kg. of seed.

Significantly, the control of loose smut of oats (*Ustilago avenae*) is, as is known, particularly difficult. The active compounds according to the present invention, however, act particularly well against this particular fungus, i.e. alone or in admixture with such carrier vehicles.

1950). The results are shown in Table 1 using benzohydroxamic acid (A), on the one hand, and benzohydroxamic acid sodium salt ($1_1$) and benzohydroxamic acid zinc salt ($2_1$):

TABLE 1

| Toxicological test | Benzohydroxamic acid (A) | Benzohydroxamic acid Na-salt ($1_1$) | Benzohydroxamic acid Zn-salt ($2_1$) |
|---|---|---|---|
| (a) Rabbit ear test | Distinct irritation | No irritation | No irritation. |
| (a) Forearm test | Very severe irritation | do | Do. |
| (b) Rabbit eye test | Severe damage | No damage | No damage. |

The present invention also provides a method of dressing seed which comprises applying to the seed the instant active compound alone or in the form of a composition containing such active compound in admixture with a solid and/or liquid dispersible carrier vehicle.

From the following experimental results, it can be seen that the active compounds according to the present invention do not exhibit the skin-irritant and mucous-membrane-irritant effects of benzohydroxamic acid.

EXAMPLE 1

(a) Human and rabbit skin test 50 mg. of the particular compound to be tested are applied to small pads of cotton wool. These are fixed for 24 hours on the forearms of humans or inside the ears of rabbits by means of adhesive plaster. After taking off the plasters, the treated skin areas are closely observed for 7 days.

(b) Test on the mucous membrane of the eye 50 mg. of the compounds to be tested are applied to the conjunctival sac of the eyes of rabbits. The animals are observed for 7 days.

The evaluation of the effects takes place in the usual manner by determining whether there is a result, and, if so, whether it is weak, distinct, strong, or very strong. (Compare also the general guidelines of the U.S. Food and Drug Administration in "Appraisal of the Safety of Chemicals in Food, Drugs and Cosmetics," The Association of Food and Drug Officials of the United States, The fungicidal effectiveness of the instant compounds in accordance with the present invention is illustrated, without limitation, by the following further examples.

EXAMPLE 2

Seed dressing test/loose smut of oats (seed-born mycosis)

To produce a suitable dry dressing, the particular active compound is extended with a mixture of equal parts by weight of talc and kieselguhr to give a finely powdered mixture with the desired concentration of such active compound.

To apply the dressing, oat seed, which is naturally infested with loose smut (*Ustilago avenae*), is shaken with the dressing in a closed glass flask. Two batches of 100 grains of the seed are sown 2 cm. deep in seed boxes containing a mixture of 1 part by volume of Fruhstorfer standard soil and 1 part by volume of quartz sand. The boxes are placed in a greenhouse at a temperature of about 18° C., kept normally moist and exposed to light for 16 hours daily. After 10–12 weeks, the oats flower and show healthy and diseased panicles (smutted panicles).

After this time, the number of diseased panicles is determined as a percentage of the total number of developed panicles. 0% means that no diseased panicles are present; 100% means that all the panicles are diseased. The fewer diseased panicles that are formed, the more effective is the given active compound.

The particular active compounds tested, their concentrations in the dressing, the amounts of dressing used and the number of diseased panicles can be seen from the following Table 2:

TABLE 2.—SEED DRESSING/LOOSE SMUT OF OATS

| Active compound | | Concentration of active compound in the dressing [1] | Amount of dressing applied [2] | Number of smutted panicles [3] |
|---|---|---|---|---|
| Undressed seed (control) | | | | 35.3 |
| (A) | 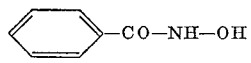 —CO—NH—OH (known) | 3<br>10<br>30 | 3<br>3<br>3 | 1.9<br>0.0<br>0.0 |
| ($3_1$) | 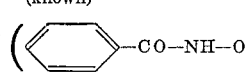 (—CO—NH—O—)$_2$ Ca | 3<br>10<br>30 | 3<br>3<br>3 | 1.0<br>0.0<br>0.0 |
| ($4_1$) | 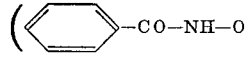 (—CO—NH—O—)$_2$ Mn | 3<br>10<br>30 | 3<br>3<br>3 | 0.0<br>0.0<br>0.0 |
| ($2_2$) | 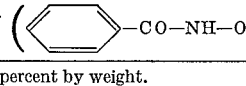 (—CO—NH—O—)$_2$ Zn | 3<br>10 | 3<br>3 | 0.0<br>0.0 |

[1] In percent by weight.
[2] In g./kg. seed.
[3] As a percentage of the total number of developed panicles.

EXAMPLE 3

Loose smut of oats test/field test

Dry dressing of oats seed naturally infested with *Ustilago avenae* is carried out in the same manner as described in Example 2. However, in five tests, 100 g. of seed in each case were sown into plots of 5 square meters. This means that for each case a total is present of about 15,000 grains on 25 square meters. Sowing takes place at the beginning of April; the counting of healthy and diseased panicles at the end of June.

The results are compiled in the following Table 3:

TABLE 3.—FIELD TEST/LOOSE SMUT OF OATS TEST

| Active compound | | Concentration of active compound in the dressing [1] | Amount of dressing applied [2] | Number of smutted panicles [3] |
|---|---|---|---|---|
| Undressed seed (control) | | | | 18.05 |
| (A) | 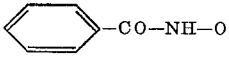—CO—NH—OH (known) | 10<br>30 | 3<br>3 | 0.27<br>0.27 |
| ($4_2$) | (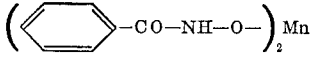—CO—NH—O—)$_2$ Mn | 3<br>10 | 3<br>3 | 0.34<br>0.08 |
| ($1_2$) | 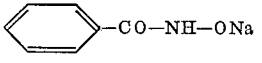—CO—NH—ONa | 3<br>10 | 3<br>3 | 0.23<br>0.19 |
| ($2_3$) | (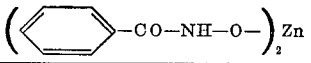—CO—NH—O—)$_2$ Zn | 3<br>10<br>30 | 3<br>3<br>3 | 0.16<br>0.12<br>0.02 |

[1] In percent by weight.
[2] In g./kg. seed.
[3] As a percentage of the total number of developed panicles.

The following still further examples are set forth to illustrate, without limitation, the manner of producing the instant compounds according to the present invention.

EXAMPLE 4

Sodium salt of benzohydroxamic acid ($1_3$)

700 g. benzohydroxamic acid are dissolved in a solution of 180 g. NaOH in 700 ml. water. The water is mostly evaporated off; the precipitated salt is filtered off and dried. The salt decomposes when heated.

EXAMPLE 5

Triethylammonium salt of benzohydroxamic acid ($5_1$)

9 g. benzohydroxamic acid are dissolved in 100 ml. of hot methanol, and 10 g. triethylamine are added. Concentration in a vacuum is effected and the triethylamine salt of benzohydroxamic acid is obtained as a solid residue, i.e.

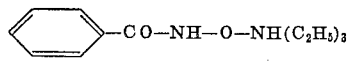—CO—NH—O—NH($C_2H_5$)$_3$

The salt decomposes upon heating.

EXAMPLE 6

Zinc salt of benzohydroxamic acid ($2_4$)

180 g. hydroxylamine sulfate are dissolved in 500 ml. of water, and a solution of 88 g. NaOH in 200 ml. of water is added at below 35° C. There is added dropwise thereto a solution of 272 g. benzoic acid methyl ester in 250 ml. methanol, and to the resulting mixture are added 84 g. NaOH in 500 ml. of water. After about 2 hours the mixture has dissolved to give a clear solution. The ester is therefore completely hydrolyzed and the sodium salt of benzohydroxamic acid has formed. A solution of 400 g. $ZnSO_4 \cdot 7H_2O$ in 500 ml. of water is run in and adjustment to pH 7 is effected with concentrated HCl.

The precipitated zinc salt is filtered off with suction and washed with water. After drying, 307 g. of zinc benzohydroxamate are obtained, which decompose when heated.

Typical examples of preferred benzohydroxamic acid salts which may be used according to the present invention are:

Benzohydroxamic acid sodium salt having the formula:

($1_4$) 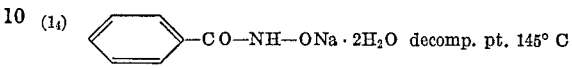—CO—NH—ONa · $2H_2O$ decomp. pt. 145° C

Toxicity-rat per os $LD_{50}$ 2990 mg./kg.

Benzohydroxamic acid zinc salt having the formula:

($2_5$)

(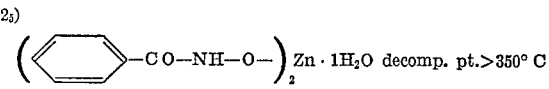—CO—NH—O—)$_2$ Zn · $1H_2O$ decomp. pt. >350° C

Toxicity-rat per os $LD_{50}$ >2550 mg./kg.

Benzohydroxamic acid calcium salt having the formula:

($3_2$)

(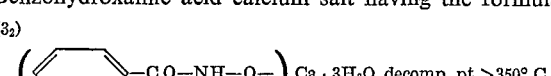—CO—NH—O—)$_2$ Ca · $3H_2O$ decomp. pt. >350° C

Benzohydroxamic acid manganese salt having the formula:

($4_3$)

(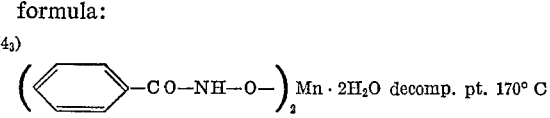—CO—NH—O—)$_2$ Mn · $2H_2O$ decomp. pt. 170° C

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Method of combating phytopathogenic fungi of the genus Ustilago which comprises applying to such fungi a fungitoxically effective amount of a benzohydroxamic acid salt of the formula

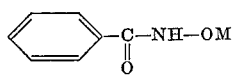

in which M is an equivalent of a member selected from the group consisting of alkali metal, alkaline earth metal, bivalent heavy metal, ammonium and $C_{1-12}$ alkyl ammonium.

2. Method according to claim 1 wherein said compound is applied in the form of a mixture with a dispersible carrier vehicle, such compound being present in a fungitoxically effective amount and constituting substantially between about 0.1–95% by weight of the mixture.

3. Method according to claim 1 wherein such compound is selected from the group consisting of:
benzohydroxamic acid sodium salt,
benzohydroxamic acid zinc salt,
benzohydroxamic acid calcium salt,
benzohydroxamic acid manganese salt, and
benzohydroxamic acid tri ethylammonium salt.

4. Method according to claim 2 wherein such compound is benzohydroxamic acid zinc salt of the formula

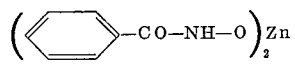

References Cited
FOREIGN PATENTS
1,210,620   2/1966   Germany _____ 424—324

OTHER REFERENCES
Chemical Abstracts 53: 5573g (1959). Chemical Abstracts 63: 18966d (1965). Chemical Abstracts 65: 6231g (1966). Alkiewiez et al., Nature, vol. 180, Nov. 30, 1957, pages 1204–1205.

JEROME D. GOLDBERG, Primary Examiner

U.S. Cl. X.R.

424—287, 288, 292, 293, 294, 295, 324